United States Patent [19]

Mullin et al.

[11] Patent Number: 4,875,952
[45] Date of Patent: Oct. 24, 1989

[54] FORCED ENCAPSULATION MEANS FOR A CABLE

[75] Inventors: Francis J. Mullin, Chamblee; William C. Reed, Lilburn, both of Ga.

[73] Assignee: American Telephone and Telegraph Company, AT&T Bell Laboratories, Murray Hill, N.J.

[21] Appl. No.: 150,480

[22] Filed: Feb. 8, 1988

Related U.S. Application Data

[63] Continuation of Ser. No. 90,437, Aug. 26, 1987, abandoned, which is a continuation of Ser. No. 619,266, Jun. 11, 1984, abandoned.

[51] Int. Cl.$^4$ .............................................. H01B 13/06
[52] U.S. Cl. ........................................ 156/48; 156/49; 156/56; 174/88 R; 174/92; 428/36.91
[58] Field of Search .................... 156/48, 49, 53, 56; 174/23 R, 76, 88 R, 92; 428/35.7, 36.91, 137, 304.4

[56] References Cited

U.S. PATENT DOCUMENTS

| | | | |
|---|---|---|---|
| 2,463,231 | 4/1945 | Wyatt | 156/49 |
| 3,466,384 | 9/1969 | Martin | 174/92 |
| 3,846,578 | 11/1974 | Bahder et al. | |
| 3,876,487 | 4/1975 | Garrett et al. | 156/48 X |
| 4,168,258 | 9/1979 | Braver et al. | |
| 4,209,352 | 6/1980 | Diaz et al. | 156/49 |
| 4,466,843 | 8/1984 | Shimirak | 156/48 |
| 4,648,919 | 3/1987 | Diaz et al. | 156/48 |
| 4,686,327 | 8/1987 | Debbaut et al. | 156/49 X |

FOREIGN PATENT DOCUMENTS 2555305 7/1976 Fed. Rep. of Germany.
14496 7/1916 United Kingdom.

OTHER PUBLICATIONS

Raychem XAGA 1600 Manufacturing Installation Booklet, Sections I-IV—1.01-4.09.

Primary Examiner—Robert A. Dawson
Attorney, Agent, or Firm—Eugen E. Pacher

[57] ABSTRACT

A forced encapsulation system and method that can be advantageously used to encapsulate cable splices e.g., multiconductor communications cables. Containment means are formed around a substrate comprising part of at least one cable, and secured to the cable, thereby forming an enclosure into which liquid encapsulant can be introduced under pressure and in which the encapsulant can be maintained at pressure above ambient pressure. In a preferred embodiment, the containment means comprise a containment bag formed in situ from an elastomer sheet and sealed to the cable sheaths, with a reinforcing outer enclosure surrounding the containment bag. Introducing the liquid encapsulant under pressure leads to thorough penetration of the encapsulant into the splice work and cable ends and to intimate contact between the cured encapsulant and the surfaces within the enclosure, including surfaces with which the encapsulant does not form an adhesive bond, resulting in improved gasketing around conductors, thereby reducing the possibility of water-caused splice damage.

11 Claims, 2 Drawing Sheets

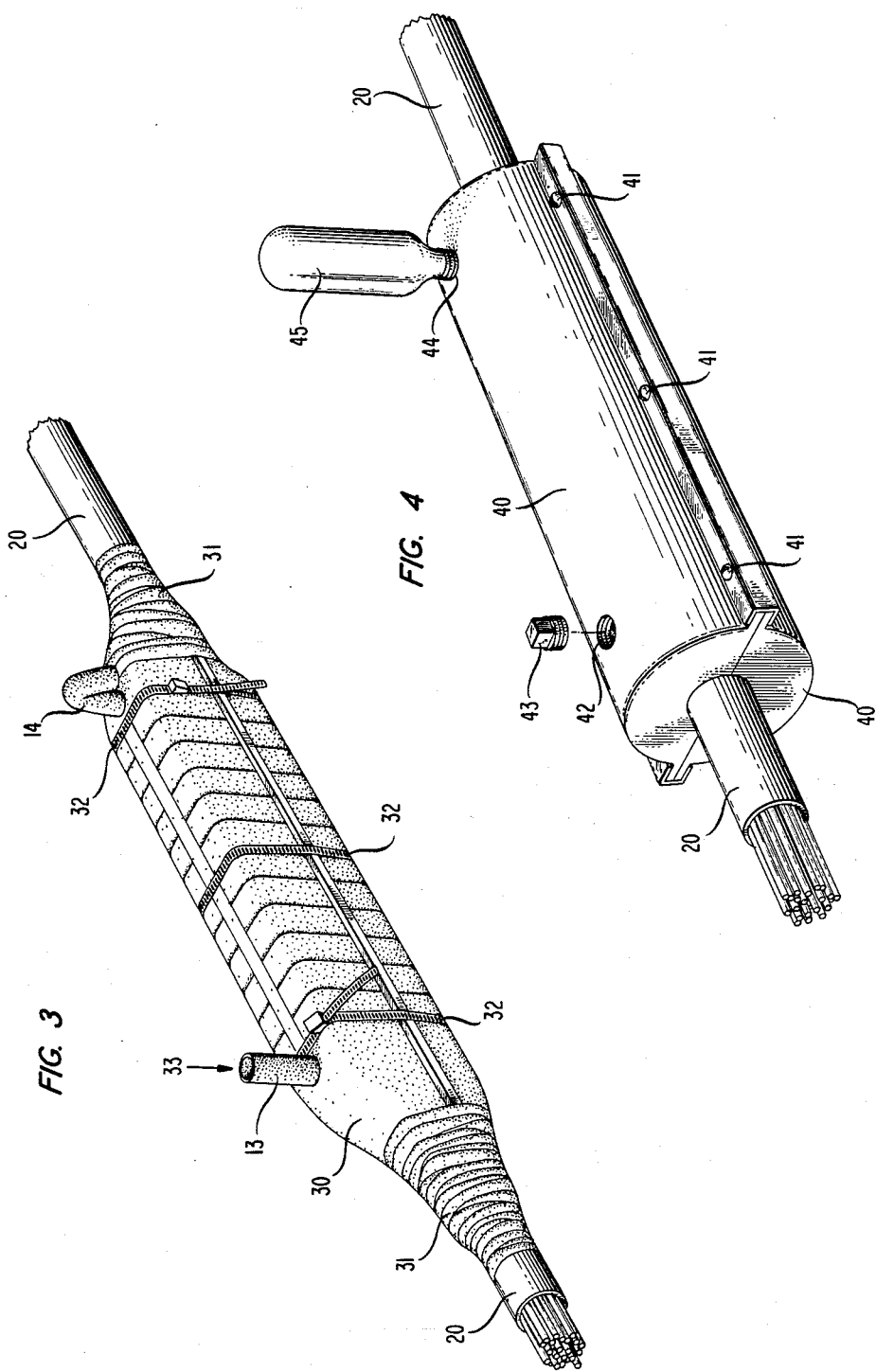

FORCED ENCAPSULATION MEANS FOR A CABLE

This application is a continuation of application Ser. No. 090,437, filed Aug. 26, 1987, now abandoned, which is a continuation of application Ser. No. 619,266, filed June 11, 1984, now abandoned.

FIELD OF THE INVENTION

This invention pertains to apparatus for forming an enclosure around a substrate, the enclosure adapted to maintaining therein a pressurized liquid, and to methods for forming such enclosure. The invention is particularly useful for encapsulating cable joints or splices.

BACKGROUND OF THE INVENTION

The need to protect a substrate from harmful environmental influences arises in many areas of technology. One general solution to the problem comprises surrounding the substrate with an appropriate encapsulant.

For instance, when the substrate region to be protected comprises a joint or splice between electrical cables, such as multiconductor communications cables of the type used in telephone systems, a prior art technique comprises providing an enclosure around the splice work, securing the enclosure to each cable entering the enclosure, and filling the enclosure with an insulating liquid curable encapsulant. The enclosure obviously has to be sufficiently leak-tight to prevent substantial loss of encapsulant during the time the encapsulant remains liquid.

In prior art systems of this type the encapsulant is universally introduced by pouring it into the enclosure under gravity. The encapsulant is thus essentially at ambient pressure. It flows to fill voids and interstices, but, being relatively viscous, does not penetrate far, if at all, into the cable ends. Also, trapped air pockets and other voids tend to remain. The main function of the encapsulant generally being protection of the conductors against contact with water, it is easily seen that such imperfections may tend to impair the effectiveness of the encapsulant. Water can enter a splice region through an enclosure imperfection or through one of the cables, in the latter case travelling from a point of damaged cable sheathing, along the conductors, to the splice region. Thus, encapsulant that does not, or does only to a limited extent, penetrate into the cable ends and/or interstices within the splice work, may not provide a sufficiently effective protection against water damage to the splice.

In a particular prior art system, a plastic liner is placed around the splice work and secured to the cables, thereby forming an enclosure into which liquid encapsulant is poured under gravity. The encapsulant in the enclosure is pressurized to some degree by wrapping ties, tape or the like, around the enclosure. In such a system, any encapsulant volume change subsequent to the wrapping leads to a change in pressure. For instance, flow of encapsulant into voids within the splice work, or into the cables, decreases the effective volume of encapsulant within the enclosure, and results in a loss of pressure. Furthermore, in such a system, the splice work is being compacted by the pressurizing means.

Since encapsulation is widely used, especially in the telecommunications industry, an approach that substantially retains the advantages of the prior art approach, e.g., convenience, re-enterability, and economy, while increasing the effectiveness of encapsulant in preventing water-induced damage to the substrate, would be of considerable interest. This application discloses such an approach.

The above-described approach to protecting a substrate is not the only one known to the art. For instance, U.S. Pat. No. 3,466,384 discloses a cable joint enclosed by an impermeable sleeve. And U.S. Pat. No. 4,209,352 discloses a method for sealing a closure member to a substrate using an inflatable bag or the like.

GLOSSARY OF TERMS

A "substrate" herein is any material object, or part thereof, that is to be protected by means of an encapsulant, the encapsulant to be introduced into an enclosure that surrounds the substrate and to be retained therein until at least a part of the encapsulant has gelled, cured, or otherwise sufficiently increased in viscosity.

A "cable" herein is an article comprising a multiplicity of elongated bodies, typically metallic bodies (conductors) but including also dielectric bodies of the type used as optical fibers, and further comprising a dielectric sheath surrounding the elongated bodies. It is to be understood that cables typically also comprise other constituents, such as coatings or insulation around the individual fibers or conductors, strength members, metallic shielding, and filling material. Examples of cables according to the definition are mutliconductor communications cables, e.g., telephone cables, and so-called distribution wire and service wire used in telephone systems. Further examples are coaxial cables of the type used in CATV systems, power cables, including cable containing power distribution wire or service wire, and optical fiber transmission or distribution cable. Cable containing service wire typically is used to connect a customer to a distribution system, and cable containing distribution wire is typically used to branch a higher-capacity cable. Cable according to the definition can be adapted to be below ground by direct burial or in buried conduit, or to be maintained above ground.

By "solidifying" or "curing" of the encapsulant is meant herein any process that results in a substantial increase of the room temperature viscosity of the encapsulant, typically, to about $10^5$ cps (from an initial viscosity of the order of $10^2$ cps). Typical stiffening processes are gellation and cross linkage.

The "ambient" pressure is about 1 bar.

SUMMARY OF THE INVENTION

We have invented means for enclosing a substrate, typically a substrate comprising at least part of a cable, preferably comprising parts of at least two multiconductor communications cables and the joint or splice between them. The means comprise first means that are adapted for being caused to envelope the substrate, and for being sealed to the substrate, to thereby form containment means adapted for receiving therein liquid encapsulant, and for containing the liquid encapsulant under a pressure that is substantially greater than ambient pressure, typically by at least about 1 psi. The containment means are adapted for maintaining the pressure above ambient pressure, typically a substantially constant pressure, for at least a time sufficient for at least a part of the encapsulant within the containment means to solidify. The solidified encapsulant can then perform a gasketing function around the substrate and- /or the parts thereof, e.g., around the conductors of a telephone cable.

In a preferred embodiment, the first means comprise a sheet of elastomer. The sheet can be placed around the substrate by wrapping it around the splice work between two cables, fastening part of the sheet to an appropriate opposed part of the sheet to thereby form a substantially tubular structure. Bag-like containment means, also referred to herein as a containment bag, are formed by securing the ends of the tubular structure to the respective cables, e.g., by adhesive and/or mechanical means. The thus formed containment bag comprises means for introducing therein liquid encapsulant, and can be pressurized, e.g., by pumping encapsulant into the bag.

Typically, flexible first means, e.g., an elastic containment bag, are to be enclosed in a substantially rigid enclosure, which serves to protect the bag as well as to limit the expansion of the bag under pressure. Filling the bag with liquid encapsulant and pressurizing the encapsulant expands the containment bag, ensures formation of a substantial layer of encapsulant between the substrate and the walls of the containment bag, and urges encapsulant into voids and interstices in the splice work. Typically, it also forces encapsulant some distance into the cables, typically resulting, after cure of the encapsulant, in improved resistance of the thus encapsulated substrate (e.g., a cable splice) against water intrusion, due to the improved gasketing ability of the inventive system, as compared to similar prior art (nonforced encapsulation) systems.

The improved gasketing ability is, inter alia, due to the fact that the cured encapsulant typically is under a compressive load. Many cables comprise materials with which it is difficult or impossible to form an adhesive bond, e.g., polyethylene. Compressively loaded cured encapsulant, urged by the load against any surface it contacts, can resist water intrusion along surfaces with which the encapsulant does not form an adhesive bond, thus forming a compressively reenforced gasket.

A further advantage of the inventive method resides in the fact that the splice work geometry generally is not altered during encapsulation. In particular, it is generally advantageous for the splice work to remain relatively loosely packed, thereby facilitating the flow of encapsulant into the splice work. In a system according to the invention, pressurization of the encapsulant typically does not disturb the splice work arrangement.

And a still further advantage of a system according to the invention is that it is generally easy to inject more encapsulant into the containment means, should the need arise. For instance, should an abnormally large volume of encapsulant penetrate into the cables, causing a drop of pressure within the containment bag, additional encapsulant can be pumped into the bag, thereby increasing the pressure again to the desired level.

The invention can be practiced with prior art encapsulants (e.g., an encapsulant of the type disclosed in U.S. Pat. No. 4,168,258) which typically have a relatively short cure time. However, it is advantageous to practice the invention with encapsulants having a relatively long cure time, such as are disclosed in U.S. patent application Ser. No. 621,083, filed June 15, 1984 (now abandoned) co-assigned with this, and such encapsulants are preferred.

Embodiments of the invention that do not comprise flexible containment means formed in situ are possible. For instance, the containment means can comprise a substantially rigid sleeve placed around the substrate and secured thereto, into which the liquid encapsulant is to be introduced. The sleeve typically comprises pressure regulated means for injecting a liquid, typically additional liquid encapsulant, into the enclosure, thereby maintaining the encapsulant pressurized.

Although the invention is advantageously used for enclosing a cable splice or joint, it has other cable gasketing applications as well. For instance, it can be used to enclose a damaged cable region, to enclose a cable end or termination, or to form a pressure block. The invention can be used with a variety of cable types, including air core and filled cable.

Disclosed is also a method for enclosing a substrate, the method comprising forming an enclosure around the substrate, the enclosure adapted for maintaining therein a quantity of liquid encapsulant under a pressure substantially greater than ambient pressure, introducing the encapsulant into the enclosure, and pressurizing the encapsulant.

BRIEF DESCRIPTION OF THE DRAWINGS

FIG. 3 schematically depicts a splice according to the invention enclosed in a reenforcing shell; and FIG. 4 shows schematically a splice according to the invention that comprises substantially rigid containment means.

Analogous features in different Figures are identified by identical numerals.

DETAILED DESCRIPTION

Figures 1, 2:
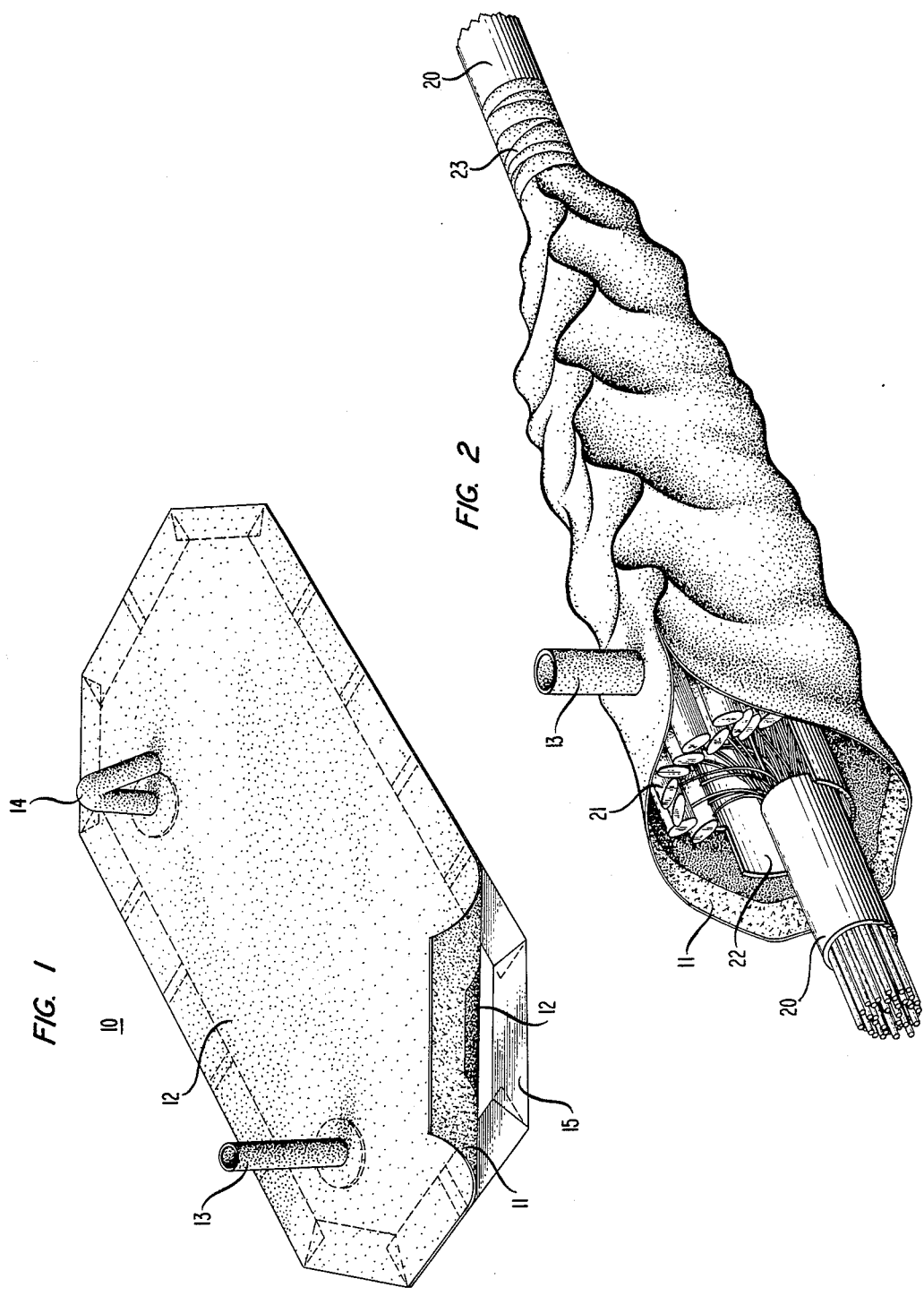
FIG. 1 schematically depicts an elastomer sheet that can be used to form a containment bag.
FIG. 2 schematically shows a partially completed containment bag around the splice between two cables.

The invention will now be further explained in terms of a particular exemplary and preferred embodiment. FIG. 1 schematically depicts a sheet 10 from which a containment bag according to the invention can be formed. The sheet comprises elastomer material, e.g., 0.03 inches thick neoprene, cut into generally rectangular shape, with the corners removed for easy securing to the spliced cables. A circumferential strip 11 of the material carries on one side a pressure-sensitive butyl-rubber-based mastic coating, protected by peel-off paper 15 from inadvertent contact. The remaining area 12 of the sheet is free of adhesive. A polyurethane pouring port 13 extends through an aperture in the sheet and is affixed to the sheet by appropriate means, e.g., pressure-sensitive rubber-based adhesive. FIG. 1 also shows a pressure indicator 14, in this case a simple elastomer finger. Use of a pressure indicator is optional.

FIG. 2 schematically shows two cable ends 20, with insulated conductors extending beyond the cable sheath, the conductors connected electrically by means of connectors 21, shown schematically only. The totality of wires, connectors, and other splice-related hardware of a cable splice is often referred to as the splice work. The splice work rests in a tray 22, which typically is attached to the cable ends (not shown), and is shown partially enclosed by a partially formed containment bag according to the invention. The bag is produced by wrapping the elastomer sheet around the splice work, removing lengths of peel-off paper from opposing sheet portions and pressing the thus exposed opposed adhesive-covered regions together, thereby joining them. FIG. 2 also shows pour spout 13 extending outward from the splice region.

The bag is completed by joining the remaining edge portions together or to the cable, in a manner that will be readily understood by those skilled in the art. The absence of the sheet corners makes it easier to neatly secure the bag to the cables. Although it may be possible to form a relatively strong adhesive bond between the sheet material and the cable sheath, it is typically advantageous to further secure the bag/cable joint by additional mechanical means, e.g., tape or ties 23, tightly applied around the joint region.

After completion of containment bag formation it is considered advantageous to pressurize the bag by forcing air into it, thereby testing the tightness of the enclosure.

Typically, it is advantageous to encase the containment bag in a reenforcing protective enclosure, as is shown in FIG. 3. Hinged polypropylene shell 30 is placed around the bag, with pour spout 13 and optional pressure indicator 14 extending through openings in the shell. After closing the shell and securing it closed by means of ties 32 or other mechanical means, tape seals 31 are formed between the shell and the cables 20, and liquid encapsulant 33 can be introduced. Encapsulants are well known in the art (see, for instance, U.S. Pat. No. 4,168,258).

The liquid encapsulant can be introduced into the containment bag by any appropriate means, provided it is possible to pressurize the inside of the bag to a pressure substantially above ambient pressure, typically at least about 1 psi above ambient, e.g., about 5 or 10 psig or even higher, and to maintain the pressure on the encapsulant substantially above ambient, typically close to the initial pressure, for an effective time, typically a time sufficient to result in at least partial solidification of the encapsulant, e.g., until the encapsulant in the spout has solidified, thereby forming a "plug" that serves to prevent escape of still liquid encapsulant through the pour spout.

A simple procedure for introducing the encapsulant is to gravity-feed a first portion of the material into the pour spout, and then force-feed further material into the spout, e.g., by means of a peristaltic hand pump. Increasing the pressure inside the shell sufficiently above ambient pressure causes pressure-indicating finger 14 to become erect. Of course, other pressure-indicating means can be used in the practice of our invention, and those skilled in the art will be able to choose those known means best suited to their particular embodiment. Furthermore, our invention can be practiced without use of pressure-indicating means. If the force-feeding means are to be removed prior to gelling of the encapsulant in the pour spout, the pour spout is to be clamped off or otherwise closed.

It will be understood that the above-described embodiment is exemplary only, and that the invention can be embodied in a variety of ways. For instance, a substantially rigid containment enclosure can be used instead of the elastic containment bag described above, as is schematically ilustrated in FIG. 4. Rigid shell 40 is placed around the splice work, secured in the closed position by, e.g., screw means 41, and secured to cables 20 by appropriate means (not shown), and filled with encapsulant through pouring port 42. After closure of 42, e.g., by means of a screw plug 43, the encapsulant is pressurized by forcing further encapsulant from pressurized reservoir 45 through pressure port 44 into the enclosure. The pressurizing system requires means for maintaining the pressure in the enclosure substantially constant. Such means are known and are not shown.

As will be appreciated by those skilled in the art, a pressurized elastic containment bladder is able to maintain internal pressure in the face of a limited volume decrease due to encapsulant flow. Therefore, external pressure-maintaining means are typically not required with embodiments that use elastic encapsulant-containing means.

As indicated, an important aspect of the invention is the provision of means that make possible maintenance of the liquid encapsulant under pressure. Such maintenance results, inter alia, in compression of air trapped in the fluid encapsulant, sufficient to force encapsulant through channels to fill voids in the splice and the cables. If used in conjunction with an outer enclosure, as shown for instance in FIG. 3, it results in preloading of the outer enclosure, thereby providing compressive reinforcement of the cured encapsulant. All of these effects serve to make gasketing encapsulants according to the invention typically more resistant to water intrusion than prior art (gravity-filled encapsulation) systems. Since water intrusion can lead to substrate damage such as conductor corrosion, resistive faults at the connectors, or other electrical and mechanical problems, communication systems using forced encapsulation according to the invention are typically less subject to such problems than prior art systems.

The water intrusion resistance of forced encapsulation splices can typically be further improved if the encapsulant is appropriately tailored in cure time and viscosity to the needs of forced encapsulation. An encapsulant suitable for the practice of the invention also advantageously is compatible with cable filling compounds. Such encapsulants are disclosed in the above-referred to U.S. patent Ser. No. 621,083. Forced encapsulation systems according to the invention can also be used with air core cables, although in such application it may be desirable to plug the cable, or otherwise prevent excessive encapsulant movement into the cable.

What is claimed is:

1. Means for enclosing a portion of at least one cable, comprising
   (a) expandable first means adapted for surrounding at least the portion of the cable and for being sealed to the cable, thereby forming containment means adapted for receiving therein, through encapsulant-introduction means, a quantity of liquid encapsulant of a type whose viscosity increases with time until the encapsulant is no longer a liquid at room temperature; and
   (b) substantially rigid outer enclosure means adapted for surrounding the containment means characterized in that
   (c) the containment means are adapted for having the liquid encapsulant therein pressurized to a first pressure that is substantially greater than ambient pressure, and for maintaining the liquid encapsulant therein under a pressure above embient pressure for a time such that at least part of the encapsulant is no longer a liquid at room temperature;
   (d) the outer enclosure means are adapted for substantially restraining expansion of the containment means with the pressurized liquid encapsulant means therein; and
   (e) the encapsulant-introduction means are of a type that permits further introduction of liquid encapsulant into the containment means after introduction and pressurization of the quantity of liquid encapsulant.

2. The means of claim 1, wherein the first pressure is at least about 1 psi above ambient pressure, and wherein the first means comprise an elastomer sheet, with part of the surface of the elastomer sheet carrying pressure-sensitive adhesive means.

3. The means of claim 1, adapted for enclosing part of each of at least two cables with a splice therebetween.

4. The means of claim 1, wherein the cable is a multiconductor communications cable.

5. The means of claim 4, wherein the cable is a telephone cable.

6. A method of enclosing a portion of at least one cable comprising
   (a) forming expandable containment means around at least the portion of the cable, the containment means being secured to the cable and being adapted for receiving therein a liquid encapsulant;
   (b) surrounding the containment means with substantially rigid outer enclosure means; and
   (c) introducing a quantity of the liquid encapsulant into the containment means, the encapsulant being of a type whose viscosity increases with time until the encapsulant is no longer a liquid at room temperature; characterized in that the method further comprises
   (d) pressurizing the encapsulant in the containment means to a first pressurize that is greater than ambient pressure, with the outer enclosure substantially restraining expansion of the containment means, and maintaining the liquid encapsulant under a pressure above ambient pressure for a time such that at least a part of the quantity of encapsulant is no longer a liquid at room temperature; and
   (e) introducing the liquid encapsulant into the containment means through encapsulant-introduction means that are of a type that permits further introduction of liquid encapsulant into the containment means after introduction and pressurization of the quantity of liquid encapsulant.

7. The method of claim 6, wherein the containment means are formed by a procedure that comprises wrapping an elastomer sheet around a part of each of at least two cables and a splice therebetween, fastening the sheet to itself such that a substantially tubular structure is formed, and securing the tubular structure to each of the two cables.

8. The method of claim 6, wherein the liquid encapsulant in the containment means is pressurized by pumping at least some of the liquid encapsulant into the containment means.

9. The method of claim 8, comprising pumping a further quantity of liquid encapsulant into the containment means after the pressure on the liquid encapsulant has decreased, whereby the pressure on the encapsulant in the enclosure means can be restored to substantially the first pressure.

10. In combination, a length of at least one cable and first means for enclosing a part of the length of cable, wherein the first means comprise
    (a) expandable containment means surrounding at least the part of the cable and secured to the cable;
    (b) substantially rigid outer enclosure means surrounding the containment means;
    (c) encapsulant, of a type that forms from a liquid encapsulant, contained within the containment means; characterized in that
    (d) the containment means comprise encapsulant-introduction means adapted for introducing therethrough a first quantity of liquid encapsulant into the containment means, the containment means adapted for pressurization of the liquid encapsulant to a first pressure above ambient pressure, with the outer enclosure substantially restraining expansion of the containment means with the pressurized liquid encapsulant therein; and
    (e) the encapsulant-introduction means are adapted for optional introduction of a further quantity of liquid encapsulant into the containment means after introduction and pressurization of the first quantity of liquid encapsulant.

11. The combination of claim 10 comprising at least two cables and a splice therebetween, wherein the containment means comprise an elastomer sheet, wrapped around a part of each of the two cables and the splice therebetween, fastened to itself and to each of the two cables; wherein the outer enclosure means comprise a split shell and means for securing the split shell closed; and wherein the encapsulant-introduction means comprise a spout that is attached to the containment means and extends through the split shell.

* * * * *